(No Model.)  2 Sheets—Sheet 1.

H. EHRHARDT.
MACHINE FOR GRINDING SAWS.

No. 510,165. Patented Dec. 5, 1893.

Witnesses:

Inventor:
Heinrich Ehrhardt,
by A. Faber du Faur,
Attorney.

(No Model.) 2 Sheets—Sheet 2.
H. EHRHARDT.
MACHINE FOR GRINDING SAWS.
No. 510,165. Patented Dec. 5, 1893.
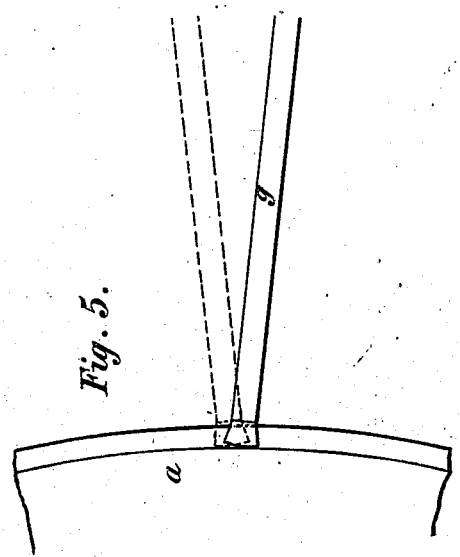
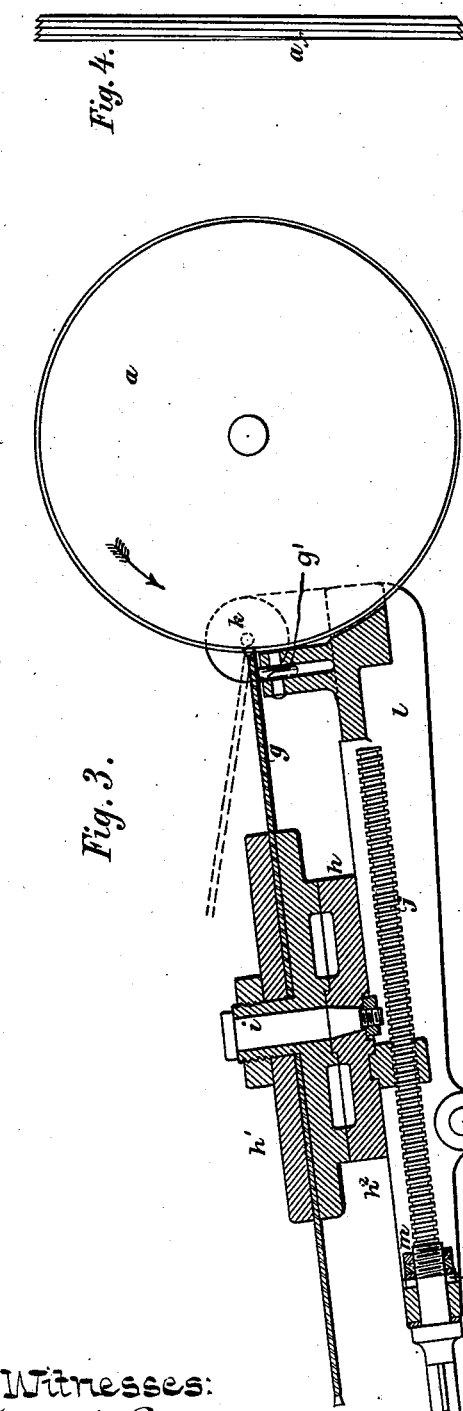
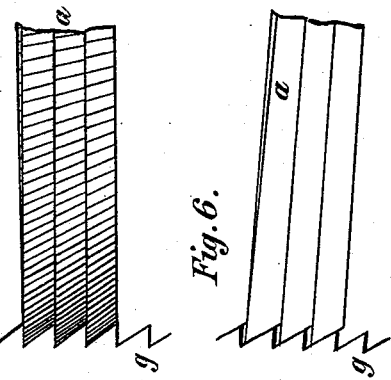
Witnesses:
Inventor:
Heinrich Ehrhardt,
by A. Faber du Faur,
Attorney.

UNITED STATES PATENT OFFICE.

HEINRICH EHRHARDT, OF DUSSELDORF, GERMANY.

MACHINE FOR GRINDING SAWS.

SPECIFICATION forming part of Letters Patent No. 510,165, dated December 5, 1893.

Application filed May 6, 1893. Serial No. 473,250. (No model.)

*To all whom it may concern:*

Be it known that I, HEINRICH EHRHARDT, a subject of the Duke of Saxe-Coburg-Gotha, residing at Dusseldorf, in the Kingdom of Prussia, Germany, have invented new and useful Improvements in Machines for Grinding Saw-Blades, of which the following is a specification.

My invention has reference to improvements in machines for grinding and for sinking the teeth of circular and straight saw blades.

The nature of my invention will best be understood when described in connection with the annexed drawings in which—

Figure 2:
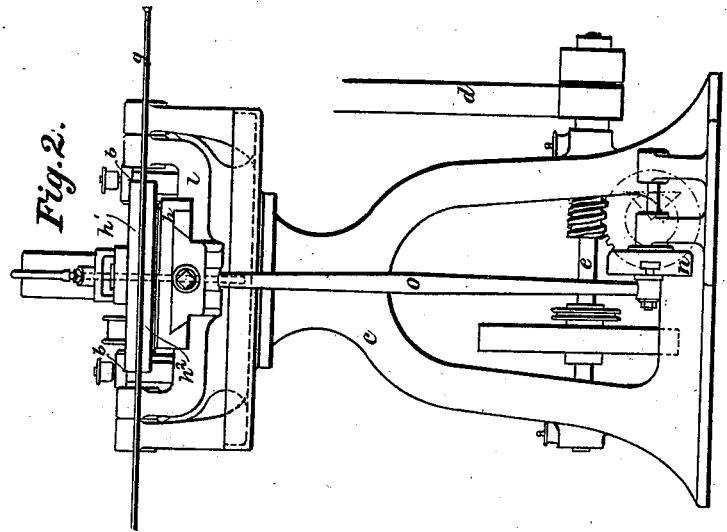
Figure 1:
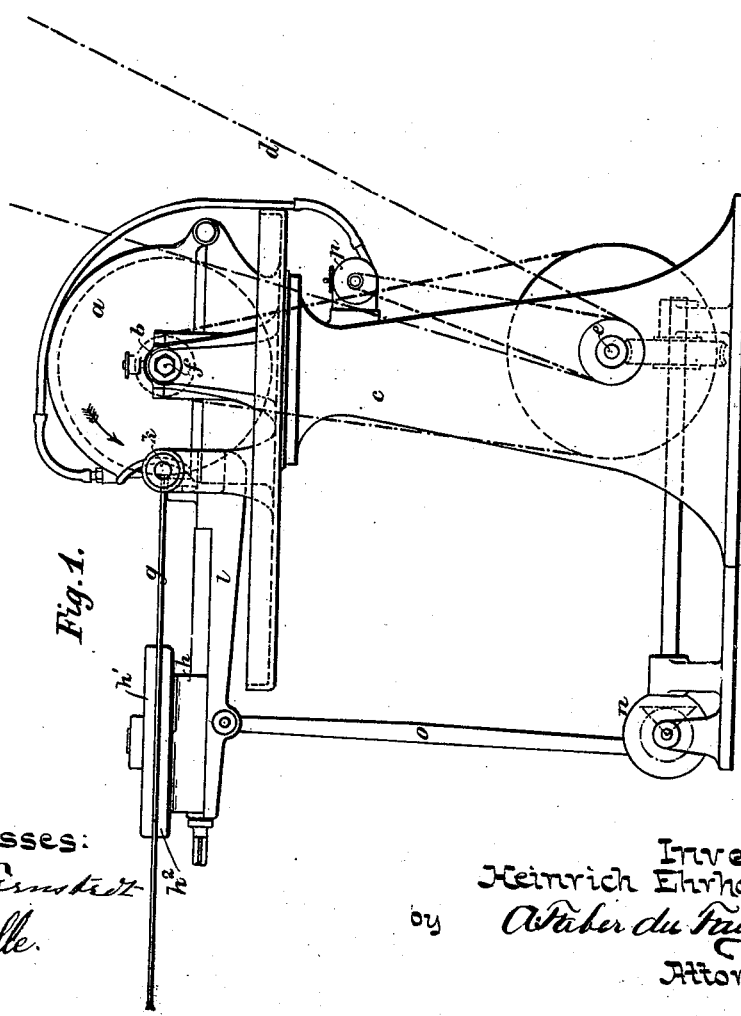

Figure 1 is a side view of a machine constructed according to my invention. Fig. 2 is a front view. Fig. 3 is a sectional view, on an enlarged scale, of the oscillatory table and the chuck for holding the saw blade. Fig. 4 is a side view of the cutter, drawn to the same scale as Fig. 3. Fig. 5 is a diagram illustrating the oscillatory motion of the table and the shape of the teeth resulting therefrom. Figs. 6 and 7 are enlarged views respectively of the cutters for grinding and for sinking the teeth.

Similar letters of reference indicate corresponding parts throughout the several views of the drawings.

Referring to Figs. 1, 2 and 3 of the drawings, the letter $c$ designates the pedestal of the machine, suitably constructed to support the operating parts. To the pedestal are secured standards having long bearings $b$ for the spindle $f$, upon which latter is mounted the cutter $a$. The cutter spindle $f$ is belted to the driving shaft $e$, which latter is rotated by a belt $d$ from a countershaft (not shown) in the usual manner.

$l$ is a table arranged to oscillate about pivots $k$. These pivots form an axis of oscillation for the table parallel to the axis of the cutter and near the periphery or cutting edge of the same. An oscillatory motion is imparted to the table, in this instance, by a crank disk $n$, which is operated by a suitable worm and gear connection with the driving shaft $e$, and is connected with a table by a rod $o$. Upon this table $l$ is mounted to slide a carriage $h$ adjustable with respect to the cutter by a screw-spindle $j$. The carriage supports a chuck arranged to freely turn about a stud $i$ secured in the carriage;—said chuck consisting of two circular jaws $h'$ $h^2$ mounted on the stud $i$ and forced together to clamp the saw blade $g$ (or the blank) by a nut in the usual manner. A roller $g'$ located close to the cutter supports the saw blade from below.

For the purpose of grinding saw blades the cutter is cut helicoidal, and in practice is made of ingot iron (flusseisen), not hardened, with the threads smooth, that is to say, not formed with transverse teeth, (Figs. 2 and 6.) A high speed, say from fifteen hundred to two thousand revolutions, is imparted to the same.

For sinking teeth into blanks the cutter is constructed as before, but the threads are formed with transverse teeth, (Fig. 7) and the cutter is run at a lower speed.

To permit the cutter to yield slightly when blades not perfectly round are being ground, an elastic cushion is formed for the carriage $h$, by a spring $m'$ inserted between the cross-bar of the table and jam nuts $m$ on the screw-spindle $j$,—said spindle being free to move longitudinally to a limited extent within its bearing.

In the operation of the machine the cutter, in view of its helicoidal structure, automatically turns the saw blade under grinding action, while the oscillatory motion of the table $l$ rounds off the backs and points of the teeth as shown in Fig. 5.

To supply water to the cutter a centrifugal pump $p$ is applied to the machine,—the waste water being collected and returned.

In practice I have found that although the cutter is made of soft iron there is no appreciable wear on the same.

When band or straight saw blades are to be ground or cut, a sliding chuck must be used in place of a rotary chuck,—otherwise the construction remains the same.

What I claim as new is—

1. In a machine of the character specified, the combination of a chuck for holding the saw blade at right angles to the cutter, and means for imparting an oscillatory motion to said chuck about an axis parallel to the axis of the cutter and near the cutting edge of the same, substantially as described.

2. In a machine of the character specified, the combination of a rotary helicoidal cutter, a table pivoted to oscillate about an axis parallel to the axis of the cutter and near the cutting edge of the same, an adjustable carriage mounted on the same, a chuck for holding the saw blade mounted to rotate, and means for oscillating the table, substantially as described.

3. In a machine of the character specified, the combination of a yielding chuck for holding the saw blade at right angles to the cutter, and means for imparting an oscillatory motion to said chuck about an axis parallel to the axis of the cutter and near the cutting edge of the same, substantially as described.

In testimony whereof I have signed my name to this specification in the presence of two subscribing witnesses.

HEINRICH EHRHARDT.

Witnesses:
SOREN LISTOE,
C. D. SCHAAFF.